Patented Oct. 18, 1932

1,883,284

UNITED STATES PATENT OFFICE

ADOLPH ZIMMERLI AND ROBERT C. LYON, OF NEW BRUNSWICK, NEW JERSEY, ASSIGNORS, BY MESNE ASSIGNMENTS, TO E. I. DU PONT DE NEMOURS & COMPANY, A CORPORATION OF DELAWARE

PURIFICATION OF QUINONE

No Drawing.   Application filed December 20, 1929. Serial No. 415,607.

This invention relates to a process of purifying crude quinone as obtained commercially by any of the known processes. The practical methods for manufacturing quinone involve an oxidation of benzene or benzene compounds. The following may be mentioned as typical examples of such methods: the oxidation of benzene electrolytically or by means of silver peroxide; the oxidation of hydroquinone by means of ferric chloride; and the oxidation of various para-di derivatives of benzene such as p-phenylenediamine, sulfanilic acid, para-aminophenol, para-phenol-sulfonic acid and benzidine, usually by means of potassium bichromate and sulfuric acid. The oxidation of aniline is another method of great importance.

In any of the above methods, particularly those involving the oxidation of an amino benzene body, the product contains certain impurities from which it cannot be economically separated. In the process of oxidizing aniline, these impurities may consist of aniline black and related dyestuffs which discolors the normally yellow quinone crystals. The quinone may also be contaminated with various brown humus-like substances which are particularly difficult to separate from the quinone.

None of the various methods which have been proposed for the purification of crude quinone or which might be obvious to one skilled in the art are satisfactory. Thus, heating the aqueous reaction mixture to dissolve the quinone, filtering the resulting solution from undissolved impurities and crystallizing the filtrate by cooling is impractical, first, because quinone is very rapidly decomposed by boiling water, and secondly, because the solubility of quinone in hot water is not much greater than in cold water. Extraction by means of organic solvents is uneconomical and practically inoperative due to the suspended solids in the reaction mass causing an emulsion of the organic solvent and the aqueous solution, thus preventing the liquids from separating into layers. Steam distillation at 100° C. yields a pure quinone but the yield is so small and such a large quantity of the original quinone is decomposed that this method has not been commercially employed on a large scale.

The price of pure quinone, as a result of these difficulties in purifying and separating it from the crude reaction mixture in which it is formed, is quite high and accordingly the purified product has not found wide application in the industrial arts. However, since quinone is very active with a large variety of compounds and has a potential value in various industries, it is believed that a commercially available high grade product would find a ready market.

It is, accordingly, an object of this invention to provide a commercially practical method for the isolation and purification of quinone.

Other and further important objects of the invention will become apparent from the following description and claims.

Although quinone is almost instantly decomposed when in contact with water at temperatures of about 100° C., that is, temperatures usually employed for effecting a steam distillation, we have found that if the temperature of distillation is lowered to about 60° C. or lower, very little if any decomposition takes place. We have further found that by working at temperatures not substantially higher than about 60° C., preferably between from about 50° to 60° or even lower, if the proper degree of vacuum is available, quinone can be steam distilled from the reaction mass in which it is formed and by suitable means, known in the art, condensed to form a pure product. Saturated steam is employed for the distillation of the quinone.

In concentrated reaction masses the ratio of quinone to water distilled at temperatures between about 50° and 60° C. is approximately 10%. Since the solubility of quinone in water at about 25° C. is only about 1.35%, it can be readily seen that the efficiency of the separation process involving steam distillation under vacuum is applicable as a practical, commercial method.

It could not, moreover, be predicted that by lowering the temperature of distillation and at the same time maintaining the steam saturated the ratio of quinone to steam in the distillate would be sufficiently high for a commercially successful process. Neither could it be predicted, in view of the fact that the decomposition of quinone is so rapid at 100° C. that by lowering the temperature of the distillation to 60° C. or not substantially higher, the decomposition of quinone would become practically negligible or at least sufficiently small to permit an excellent recovery of quinone material.

For the most economical working of this process it is not practical to steam distill all the quinone material from the reaction mass, as certain portions remaining in the mass are more economically utilized by converting them into quinone derivatives from which the impurities associated with the reaction mass may readily be separated. It is to be further stated that the mother liquors resulting from the first crystallization of quinone from the steam distillate should not be discarded, for such liquors contain a material amount of quinone, which may be recovered by any one of the several methods indicated below.

The following example, in which parts by weight are given, serves to illustrate a preferred form of the invention.

*Example*

The reaction mixture, obtained by oxidizing 290 parts of aniline with manganese dioxide in acid solution in the known manner and consisting in part of a suspension and in part of a solution of about 233 parts of quinone in 9000 parts of dilute sulfuric acid together with an excess of manganese dioxide and brown suspended by-products, is charged into a still of appropriate capacity. The mass is placed under a vacuum equivalent to about 27 inches of mercury and then heated by means of immersed coils to from about 50° to 60° C. Distillation commences when the temperature reaches about 50° C. The distillate is condensed by passing the vapors into cold water or into a cold aqueous solution of quinone. The product comprising crystals of quinone, which solidify in the distillate, is filtered off, washed with a small amount of water and dried. The product is of excellent quality.

The quinone contained in the mother liquor resulting from the filtration step may be recovered in a variety of ways. It may be extracted with an organic solvent and recovered from the solvent since the objectionable solid matter, causing emulsification has been removed; it may be distilled from the mother liquor in an analogous manner to that employed when working with the crude reaction mass, or it may be transformed into quinone derivatives.

The reaction mass will also retain a certain amount of quinone. However, it has been found more practical to consume this quinone residue by employing it as a starting material for making quinone derivatives, such as hydroquinone, than to isolate it by a steam distillation.

It is of course to be understood that the above method of isolating quinone may be applied to other quinone reaction masses or to crude benzoquinone prepared by any method, the above example being given merely to illustrate a preferred method of isolation and purification from a specific reaction mixture.

We are aware that numerous details of the process may be varied through a wide range without departing from the principles of this invention, and we, therefore, do not propose limiting the patent granted hereon otherwise than necessitated by the prior art.

We claim as our invention:

1. The process of purifying crude quinone which comprises subjecting the quinone to steam distillation under a vacuum and at a temperature not substantially exceeding 60° C.

2. The process of purifying crude quinone obtained by the oxidation of an aromatic compound of the benzene series, which comprises subjecting the quinone to steam distillation under a vacuum and at a temperature not substantially exceeding 60° C.

3. The process of purifying crude quinone obtained by the oxidation of aniline which comprises subjecting the quinone to distillation with saturated steam under a vacuum and at a temperature less than 60° C.

4. The process of purifying crude quinone which comprises subjecting the quinone to distillation with steam under a vacuum of about 26 to 27 inches.

5. The process of purifying crude quinone which comprises subjecting the quinone to distillation with saturated steam under a vacuum of about 26 to 27 inches.

6. The process of purifying crude quinone which comprises steam distilling the quinone under a vacuum and at a temperature of from 50 to 60° C., condensing the distillate in a cold solution of quinone and filtering the solution to recover the quinone crystals.

In testimony whereof, we have hereunto subscribed our names at New Brunswick, county of Middlesex, New Jersey.

ADOLPH ZIMMERLI.
ROBERT C. LYON.